T. F. CALLAHAN.
ROLLER BEARING FOR SHAFTS.
APPLICATION FILED JAN. 12, 1910.
950,433.
Patented Feb. 22, 1910.
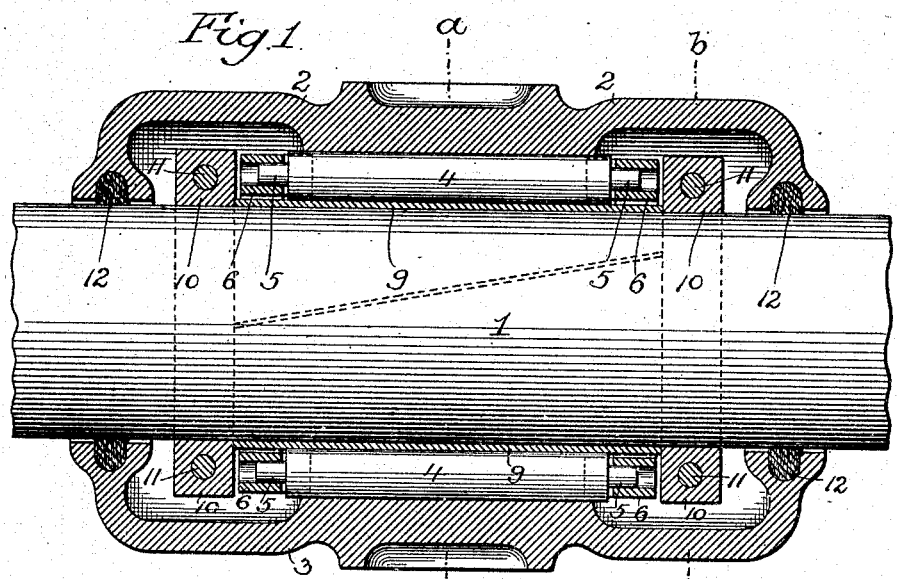
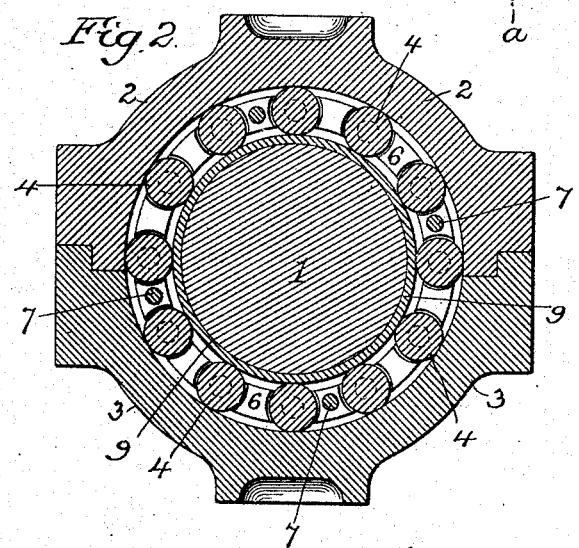
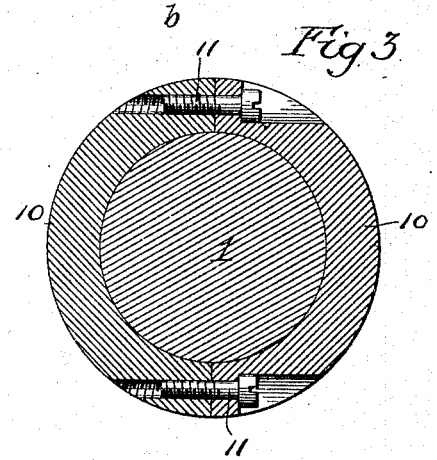
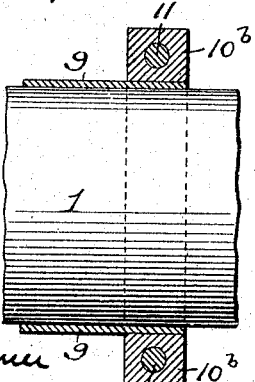
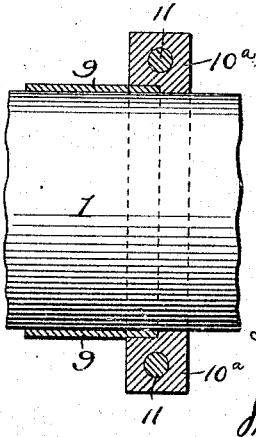
Witnesses
Hamilton D. Turner
Elsie Fullerton
Inventor
Timothy F. Callahan
by his attorneys
Smith & Frazier

UNITED STATES PATENT OFFICE.

TIMOTHY F. CALLAHAN, OF ROYERSFORD, PENNSYLVANIA, ASSIGNOR TO JOHN D. SELLS, OF PHILADELPHIA, PENNSYLVANIA.

ROLLER-BEARING FOR SHAFTS.

950,433.  Specification of Letters Patent.  Patented Feb. 22, 1910.

Original application filed November 28, 1908, Serial No. 464,895. Divided and this application filed January 12, 1910. Serial No. 537,772.

*To all whom it may concern:*

Be it known that I, TIMOTHY F. CALLAHAN, a citizen of the United States, and a resident of Royersford, Pennsylvania, have invented certain Improvements in Roller-Bearings for Shafts, (the same being a division of my application, Serial No. 464,895, filed November 28, 1908,) of which the following is a specification.

The object of my invention is to so construct a roller bearing for shafts as to provide on the shaft a longitudinally retained raceway for the rollers, and to prevent the roller structure from contacting with the ends of the bearing, or other non-rotating member thereof. This object I attain in the manner hereinafter set forth, reference being had to the accompanying drawing, in which—

Figure 1 is a vertical longitudinal section of a roller bearing for shafts constructed in accordance with my invention; Fig. 2 is a vertical transverse section of the same on the line $a$—$a$, Fig. 1; Fig. 3 is a vertical transverse section on the line $b$—$b$, Fig. 1, and Figs. 4 and 5 are longitudinal sectional views illustrating certain special constructions in accordance with my invention.

In the drawing, 1 represents the shaft and 2 and 3, respectively, the upper and lower members of the two-part bearing therefor, which may be secured together in any appropriate manner. Running upon an internal race in the bearing are a series of anti-friction rollers 4, of which there may be as many as desired, twelve being shown in the present instance, each of these rollers having, at each end, a projecting journal 5, which is adapted to an opening in a separator ring 6, said separator rings being maintained at the proper distance apart by means of suitable stay rods 7. In order to provide on the shaft a proper raceway for the rollers 4, said shaft is provided with a hardened steel bushing 9, preferably split, as shown by dotted lines in Fig. 1, in order to facilitate its application to the shaft, this bushing being retained in its proper longitudinal relation to the rollers 4 and to the ends of the bearing by collars 10, preferably split and clamped upon the shaft at each end of the bushing by means of transverse screws 11, although they may be otherwise secured to the shaft, if desired. These collars contact with the ends of the bushing and not only prevent longitudinal movement of the same on the shaft but also serve to maintain the roller structure in its proper longitudinal relation to the shaft and bearing, by reason of their contact with the ends of the separator rings 6 whenever there is any tendency of the latter to move longitudinally within the bearing. In some cases I prefer to recess the collars 10 so that they may be permitted to overlap the ends of the bushing 9, as shown, for instance, at $10^a$ in Fig. 4, the tightening of the clamping screws 11 in this case serving not only to clamp the collars upon the shaft but also to contract the ends of the split bushing 9 as well, thereby causing the latter to grip the shaft and thus aid in retaining the bushing in its proper longitudinal position upon said shaft. In some cases the collars may be mounted wholly upon the ends of the split bushing as shown, for instance, at $10^b$ in Fig. 5, the clamping of the bushing upon the shaft by the collars, being relied upon to prevent either rotary or longitudinal movement of the same independently of the shaft. By the interposition of the collars between the separator rings 6 and the ends of the bearing, contact of said rotating separator rings with the non-rotating ends of the bearing is prevented and friction is thereby reduced.

The ends of the bearing are provided with the usual packings 12 for contact with the shaft to prevent access of dirt or dust to the interior of the bearing or the escape of oil therefrom.

I claim:

1. The combination, in a roller bearing for shafts, of a relatively fixed bearing for the shaft, a series of rollers, a bushing upon the shaft providing a raceway for said rollers, and collars at the ends of the bushing between the rollers and the ends of the fixed bearing which prevent longitudinal displacement of the bushing upon the shaft and also prevent contact of the rotating roller bearing structure with the fixed ends of the bearing.

2. The combination, in a roller bearing for shafts, of a relatively fixed bearing for the shaft, a series of rollers, a bushing upon the shaft providing a raceway for said rollers, and split clamping collars at the ends of the bushing between the rollers and the ends of the fixed bearing which prevent longitudinal displacement of the bushing upon the shaft and also prevent contact of the rotating roller bearing structure with the fixed ends of the bearing.

3. The combination, in a roller bearing for shafts, of a relatively fixed bearing for the shaft, a series of rollers, a bushing upon the shaft providing a raceway for said rollers, and clamping collars located at the ends of the bushing between the rollers and the ends of the fixed bearing and exercising a contractile influence upon said ends of the bushing, said collars preventing longitudinal displacement of the bushing upon the shaft and also preventing contact of the rotating roller bearing structure with the fixed ends of the bearing.

4. The combination, in a roller bearing for shafts, of a relatively fixed bearing for the shaft, a series of rollers, a bushing upon the shaft providing a raceway for said rollers, and collars at the ends of the bushing between the rollers and the ends of the fixed bearing, said collars directly engaging the shaft at the ends of the bushing and serving to prevent longitudinal displacement of the bushing upon the shaft and also to prevent contact of the rotating roller bearing structure with the fixed ends of the bearing.

5. The combination, in a roller bearing for shafts, of a relatively fixed bearing for the shaft, a series of rollers, a bushing upon the shaft providing a raceway for said rollers, and clamping collars at the ends of the bushing between the rollers and the ends of the fixed bearing, said collars directly engaging the shaft at the ends of the bushing and also exercising a contractile influence upon the bushing and serving to prevent longitudinal displacement of the bushing upon the shaft and also to prevent contact of the rotating roller bearing structure with the fixed ends of the bearing.

6. The combination, in a roller bearing for shafts, of a relatively fixed bearing for the shaft, a series of rollers, a bushing applied to the shaft and providing a raceway for said rollers, separator rings at the ends of the rollers, and collars between the rollers and the ends of the fixed bearing and which serve to confine the bushing, the rollers and the separator rings in their proper longitudinal position in respect to the shaft and bearing, whereby the rotating roller bearing structure is prevented from contact with the fixed ends of the bearing.

7. The combination, in a roller bearing for shafts, of a relatively fixed bearing for the shaft, a series of rollers, a bushing applied to the shaft and providing a raceway for said rollers, separator rings at the ends of the rollers, and collars applied directly to the shaft between said rings and the ends of the fixed bearing and serving to confine the bushing, the rollers and the separator rings in their proper longitudinal position in respect to the shaft and bearing, whereby the rotating roller bearing structure is prevented from contact with the fixed ends of the bearing.

8. The combination, in a roller bearing for shafts, of a relatively fixed bearing for the shaft, a series of rollers, a bushing applied to the shaft and providing a raceway for said rollers, and collars between the rollers and the ends of the fixed bearing and which serve to confine the bushing and the rollers in their proper longitudinal position in respect to the shaft and bearing, and prevent the rollers from contacting with the fixed ends of the bearing.

In testimony whereof, I have signed my name to this specification, in the presence of two subscribing witnesses.

TIMOTHY F. CALLAHAN.

Witnesses:
 ROBT. G. SCHICK,
 DANIEL HINSBERGER.